United States Patent
Fu et al.

(10) Patent No.: US 11,190,091 B1
(45) Date of Patent: *Nov. 30, 2021

(54) FOUR-STATOR AND FOUR-ROTOR COMBINED ENERGY-SAVING MOTOR

(71) Applicant: Shenzhen Yiji Manufacturing Co., Ltd., Shenzhen (CN)

(72) Inventors: Zhenqiang Fu, Shenzhen (CN); Zhaohong Zheng, Shenzhen (CN)

(73) Assignee: Shenzhen Yiji Manufacturing Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,876

(22) Filed: Oct. 16, 2020

(30) Foreign Application Priority Data

May 29, 2020 (CN) .......................... 202010478616.5

(51) Int. Cl.
*H02K 16/00* (2006.01)
(52) U.S. Cl.
CPC .................................. *H02K 16/00* (2013.01)
(58) Field of Classification Search
CPC ........ H02K 1/141; H02K 1/143; H02K 1/148; H02K 1/14; H02K 16/00; H02K 16/02; H02K 16/04; H02K 2201/06
USPC ......................................... 310/112, 113, 114
See application file for complete search history.

(56) References Cited

U.S. PATENT DOCUMENTS

| | | | | |
|---|---|---|---|---|
| 2002/0163270 A1* | 11/2002 | Almada | ................. | H02K 1/278 310/156.47 |
| 2006/0131985 A1* | 6/2006 | Qu | .......................... | H02K 1/14 310/266 |
| 2008/0036215 A1* | 2/2008 | Gizaw | .................... | H02K 29/03 290/55 |
| 2009/0278415 A1* | 11/2009 | Park | ....................... | H02K 16/00 310/156.08 |
| 2010/0171451 A1* | 7/2010 | Quere | .................... | H02K 16/00 318/400.09 |
| 2010/0264769 A1* | 10/2010 | Park | ....................... | H02K 16/00 310/125 |
| 2012/0286616 A1* | 11/2012 | Li | ....................... | H02K 21/029 310/191 |
| 2016/0322873 A1* | 11/2016 | Udo | ....................... | H02K 1/278 |
| 2016/0376741 A1* | 12/2016 | Kim | ....................... | H02K 1/148 310/90 |

FOREIGN PATENT DOCUMENTS

GB 2459061 A * 10/2009 ............. H02K 1/148

* cited by examiner

*Primary Examiner* — Quyen P Leung
*Assistant Examiner* — Eric Johnson
(74) *Attorney, Agent, or Firm* — Getech Law LLC; Jun Ye

(57) ABSTRACT

The invention discloses a motor, which comprises four rotors and four stators. The rotor comprises an outer rotor part and an inner rotor part, the outer rotor part is arranged outside the cylindrical inner rotor part, an inner stator zone is formed between the outer rotor part and the inner rotor part, and an outer stator zone is formed between the outer rotor part and the motor shell; the outer rotor part and the inner rotor part are connected by flange, and the inner stator zone is divided into a first inner stator zone and a second inner stator zone by flange; the outer stator zone is divided into a first outer stator zone and a second outer stator zone by flange; the four stators are arranged in the first inner stator zone, the second inner stator zone, the first outer stator zone and the second outer stator zone respectively.

5 Claims, 10 Drawing Sheets

FOUR-STATOR AND FOUR-ROTOR COMBINED ENERGY-SAVING MOTOR

TECHNICAL FIELD

The present invention relates to the technical zone of motor, and in particular, is a new four-stator and four-rotor combined energy-saving motor.

BACKGROUND ART

The traditional permanent magnet motor can be divided into internal rotor motor and external rotor motor according to the position of the rotor, wherein the internal rotor motor sets the rotor in the circular area surrounded by stators, while the external rotor motor sets the rotor outside stators. In the traditional permanent magnet motor, the windings on the stator are energized and switched automatically under the action of magnetic induction hall or magnetic induction coil, which generates a rotating magnetic zone of magnetic induction line and drives the rotor to rotate.

When the stator of a traditional permanent magnet motor is energized, only one side of the magnetic zone generated by the winding has an effect on the rotor, while the magnetic zone on the other side cannot have an effect on the rotor, resulting in a waste of energy.

SUMMARY

To overcome the defects of the existing technology, the technical problem to be solved is: how to use the magnetic zones on both sides of the stator winding to drive the rotor.

For this purpose, the present invention adopts the following technical scheme:

The new four-stator and four-rotor combined energy-saving motor comprises a motor shell, four rotors and four stators, wherein the stators and the four rotors are arranged in the motor shell, the stator comprises a plurality of circularly distributed stator cores, and the stator cores are wound with magnetic induction lines passing through the coils at both radial sides of the stator cores; the rotor comprises an outer rotor part, an inner rotor part and a flange; the outer rotor part is arranged outside the cylindrical inner rotor part, and the outer rotor part and the inner rotor part are connected by flange; an inner stator zone is formed between the outer rotor part and the inner rotor part, and an outer stator zone is formed between the outer rotor part and the motor shell; the outer rotor part and the inner rotor part are connected by flange, and the inner stator zone is divided into a first inner stator zone and a second inner stator zone by flange; the outer stator zone is divided into a first outer stator zone and a second outer stator zone by flange; the four stators are arranged in the first inner stator zone, the second inner stator zone, the first outer stator zone and the second outer stator zone respectively; the inner side of the outer rotor part and the outer side of the inner rotor part are provided with a plurality of circularly distributed permanent magnet modules, and two adjacent permanent magnet modules have opposite polarity.

Beneficially or exemplarily, the stator cores of the stator placed in the outer stator area are fixed on the inner surface of the motor shell.

Beneficially or exemplarily, the stator further comprises a fixing ring and fixing support, wherein the stator cores are circularly distributed on the fixing ring, and the fixing support fixes the stator cores on the fixing ring; the stator cores are an I-shaped structure, which comprises a first arch part, a second arch part and a middle part, wherein the first arch part and the second arch part are connected by the middle part, and the coils are wound on the middle part with slots at both sides; a fixing hole of the first arch part vertically runs through the first arch part, and the fixing support passes through the fixing hole and is fixedly connected to the fixing ring; the stator cores of the stator in the inner stator zone are arranged as follows: the first arch part faces towards the outer rotor part, and the second arch part faces towards the inner rotor part.

Beneficially or exemplarily, each of the permanent magnet modules comprises a plurality of permanent magnets, wherein the permanent magnets of the permanent magnet module of the inner rotor part are vertically mounted along the outer side thereof, and the permanent magnets of the permanent magnet module of the outer rotor part are inclinedly mounted along the inner side thereof;

Beneficially or exemplarily, the permanent magnets of the permanent magnet module of the inner rotor part are inclinedly mounted along the outer side of the inner rotor part, and the permanent magnets of the permanent magnet module of the outer rotor part are vertically mounted along the outer side of the outer rotor part.

Beneficially or exemplarily, the angle of inclination of the inclinedly mounted permanent magnets is 5 to 15 degrees.

Beneficially or exemplarily, the permanent magnet modules of the inner rotor part and the outer rotor part have opposite positions and the same quantity, and the permanent magnet modules at the opposite positions of the inner rotor part and the outer rotor part have opposite polarity facing the stator zone.

Beneficially or exemplarily, the permanent magnets of the permanent magnet module of the inner rotor part are vertically mounted along the outer side of the inner rotor part, and the permanent magnets of the permanent magnet module of the outer rotor part are vertically mounted along the inner side of the outer rotor part.

Beneficially or exemplarily, it further comprises a rotating shaft, wherein the rotating shaft is connected to the inner rotor part, and passes through and is connected to the frontend cover and the backend cover through rotation of a bearing, and the stators are fixed on the frontend cover and the backend cover.

The present invention has the following beneficial effect:

Through the structure design of rotor and stator, the present invention fully utilizes the magnetic zones on both sides of the inner stator area and the inner rotor and outer rotor are fully utilized. The overall output power of the motor is equal to the sum of the powers of the inner rotor and outer rotor, which makes full use of the magnetic zones on both sides of the stator and avoids the waste of energy.

Furthermore, the present invention also makes full use of the internal space of the motor and sets the stator between the outer rotor part and the motor shell, so that the magnetic zones on both sides of the permanent magnet module 35 of the outer rotor part can also be utilized, which further improves the overall output power of the motor.

Under the above two kinds of energy saving effects, compared with the traditional motor, under the condition of reaching the same power, the present invention uses fewer winding sets, which greatly reduces stator size, uses fewer winding materials, and has higher economic benefit.

DETAILED DESCRIPTION

Figure 1:
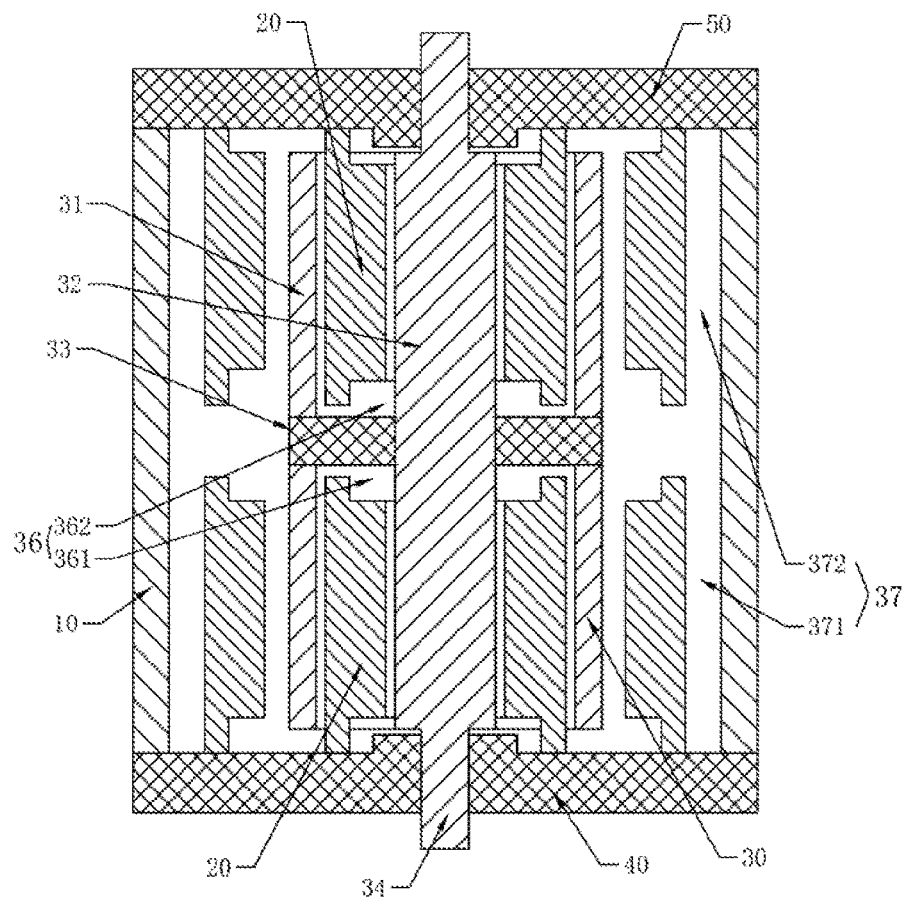
FIG. 1 is a sectional view of the structure of a new four-stator and four-rotor combined energy-saving motor in an embodiment of the present invention
Figure 2:
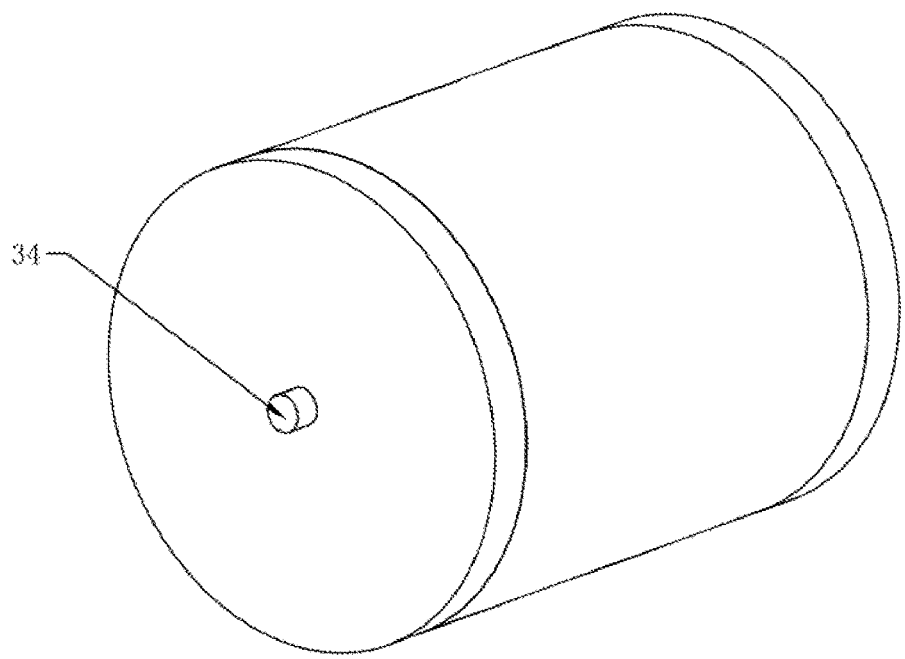
FIG. 2 is a stereogram of the structure of a new four-stator and four-rotor combined energy-saving motor in an embodiment of the present invention
Figure 3:
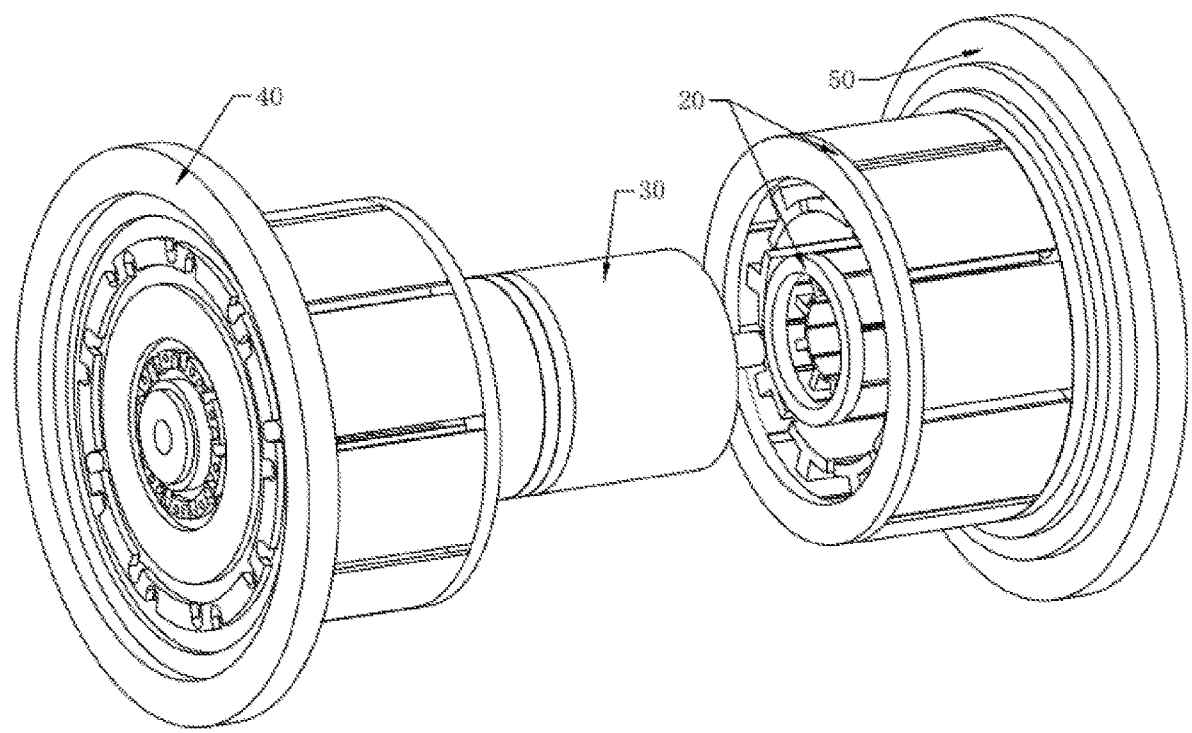
FIG. 3 is a matching view of the four stator and rotor of a new four-stator and four-rotor combined energy-saving motor in an embodiment of the present invention
Figure 4:
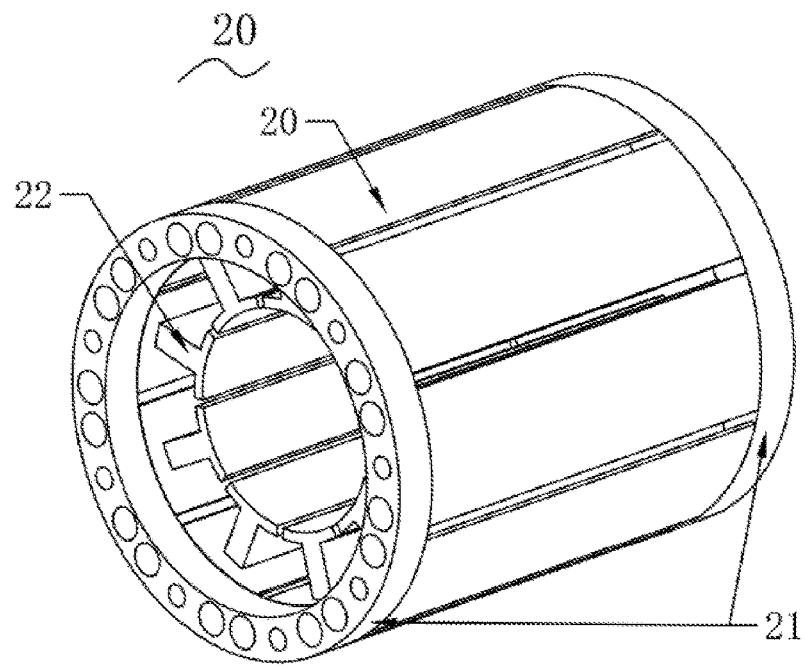
FIG. 4 is the structural diagram of the stator of a new four-stator and four-rotor combined energy-saving motor in an embodiment of the present invention
Figure 5:
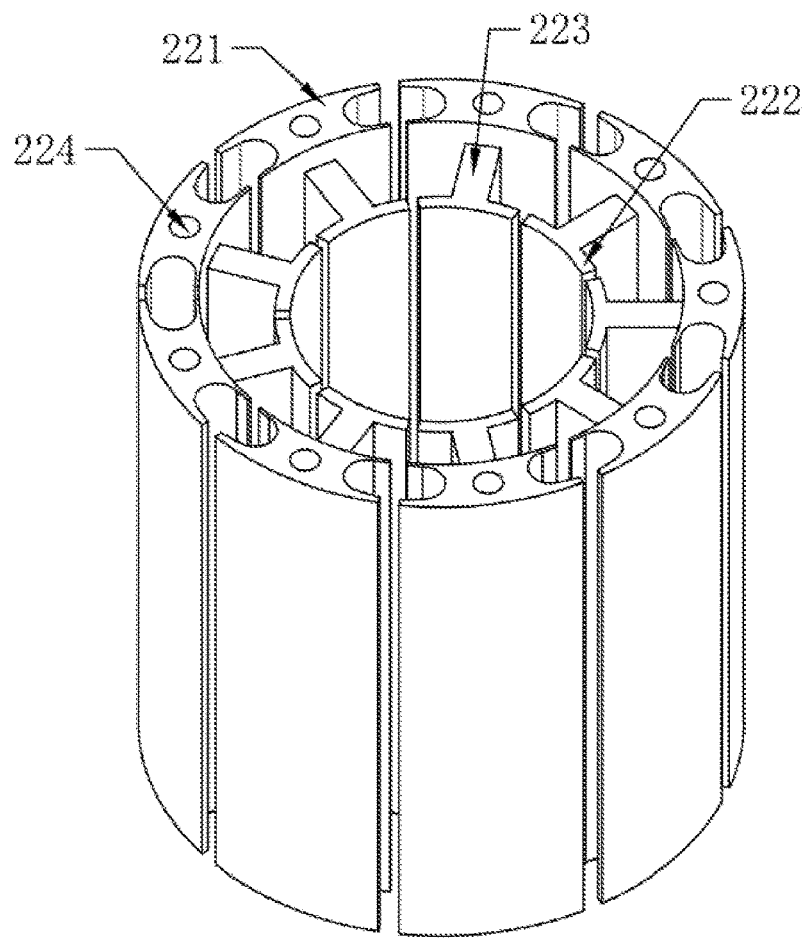
FIG. 5 is a schematic diagram of the stator core distribution of a new four-stator and four-rotor combined energy-saving motor in an embodiment of the present invention
Figure 6:
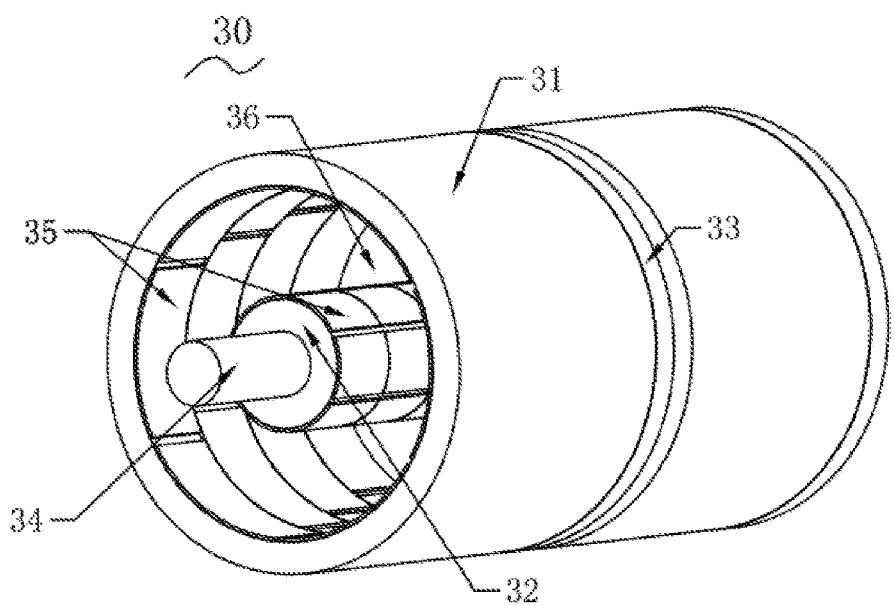
FIG. 6 is the structural diagram of the rotor of a new four-stator four-rotor combined energy-saving motor in an embodiment of the present invention
Figure 7:
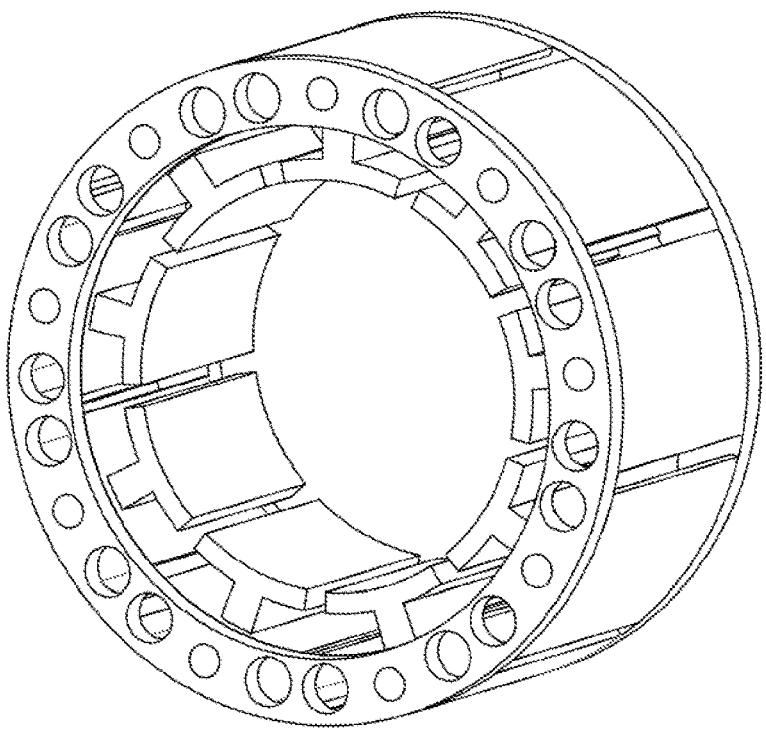
FIG. 7 is the structural diagram of the stator of the outer stator zone of a new four-stator and four-rotor combined energy-saving motor in an embodiment of the present invention
Figure 8:
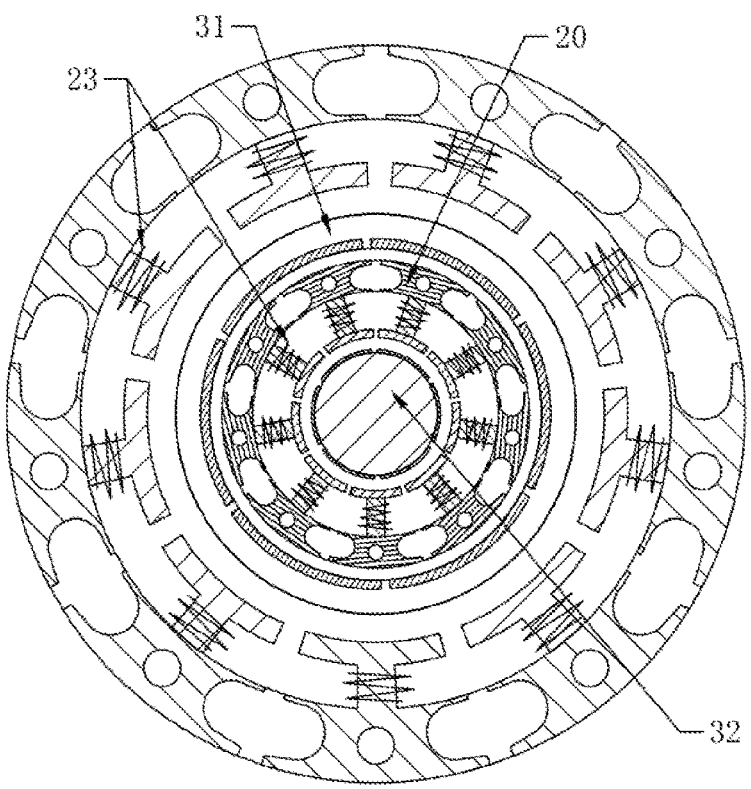
FIG. 8 is a sectional view of the stator and rotor of a new four-stator and four-rotor combined energy-saving motor in an embodiment of the present invention
Figure 9:
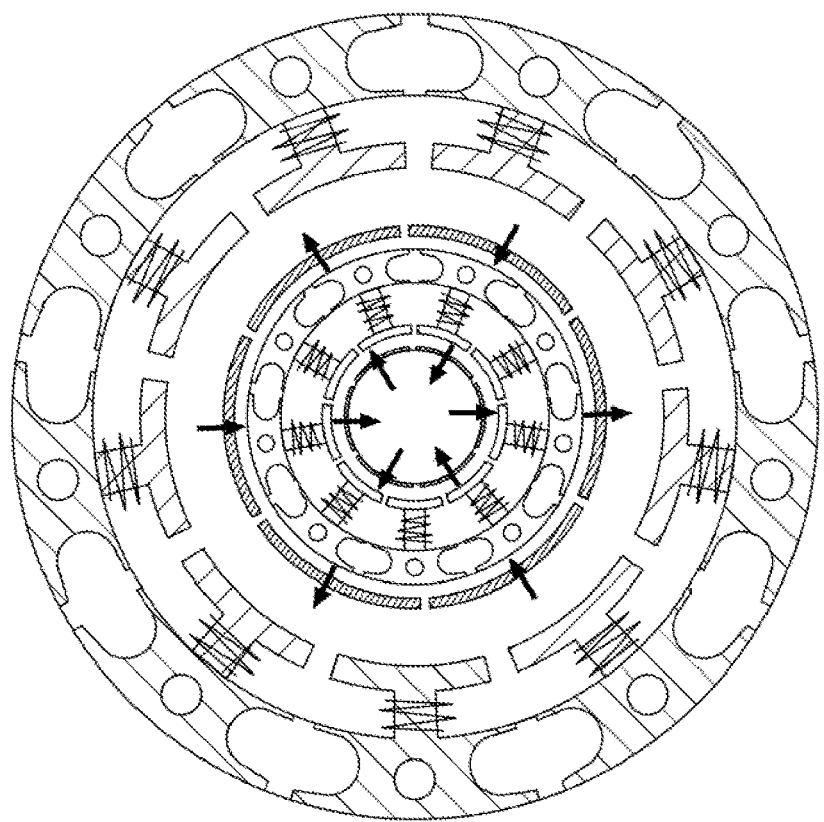
FIG. 9 is the directional diagram of the magnetic induction line of the permanent magnet module of the inner rotor part and the outer rotor part of a new four-stator four-rotor combined energy-saving motor
Figure 10:
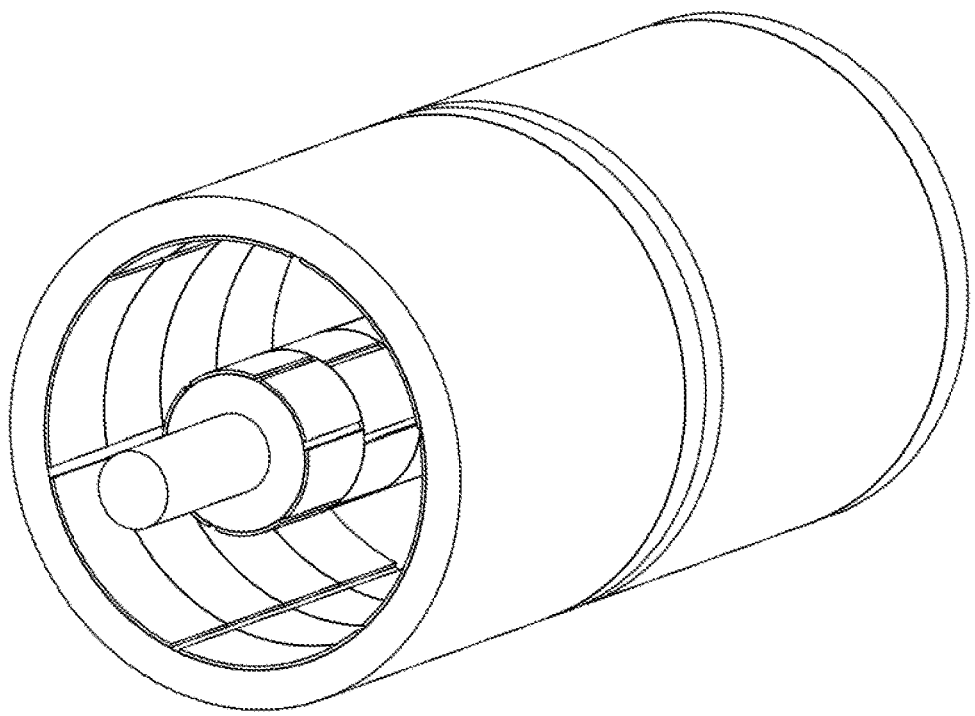
FIG. 10 is the structural diagram of the rotor of a new four-stator four-rotor combined energy-saving motor in an embodiment of the present invention
Figure 11:
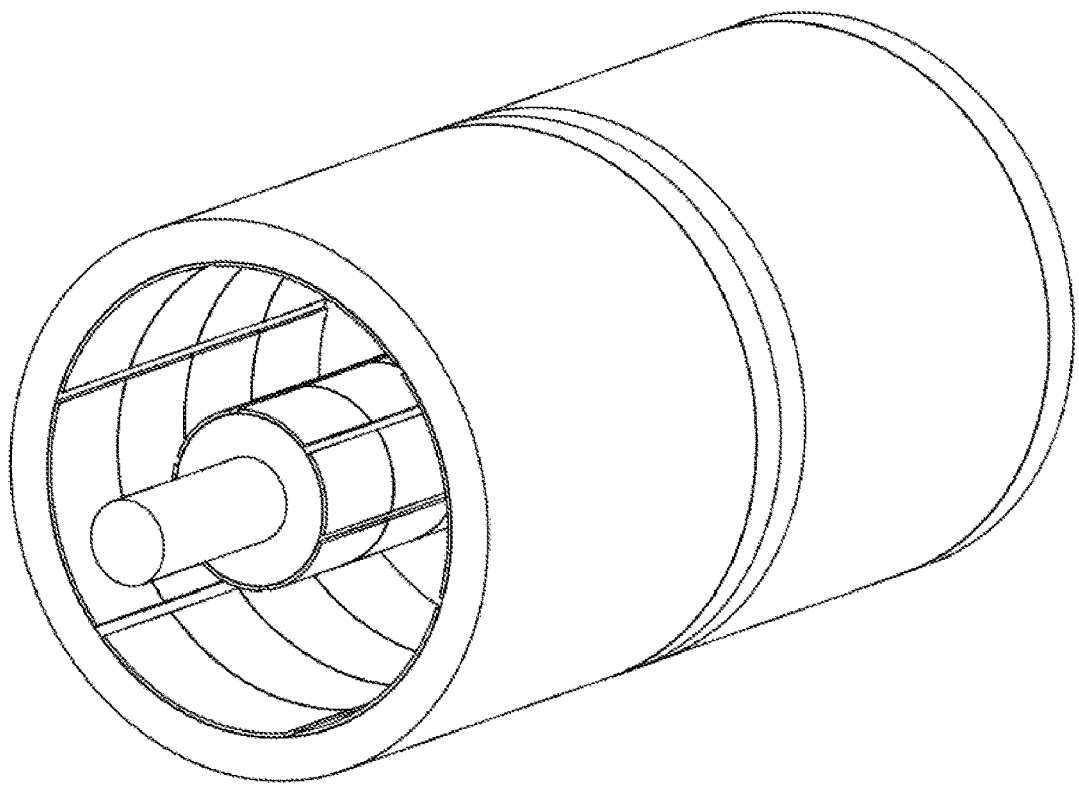
FIG. 11 is the structural diagram of the rotor of a new square wave permanent magnet energy saving motor in an embodiment of the present invention
Figure 12:
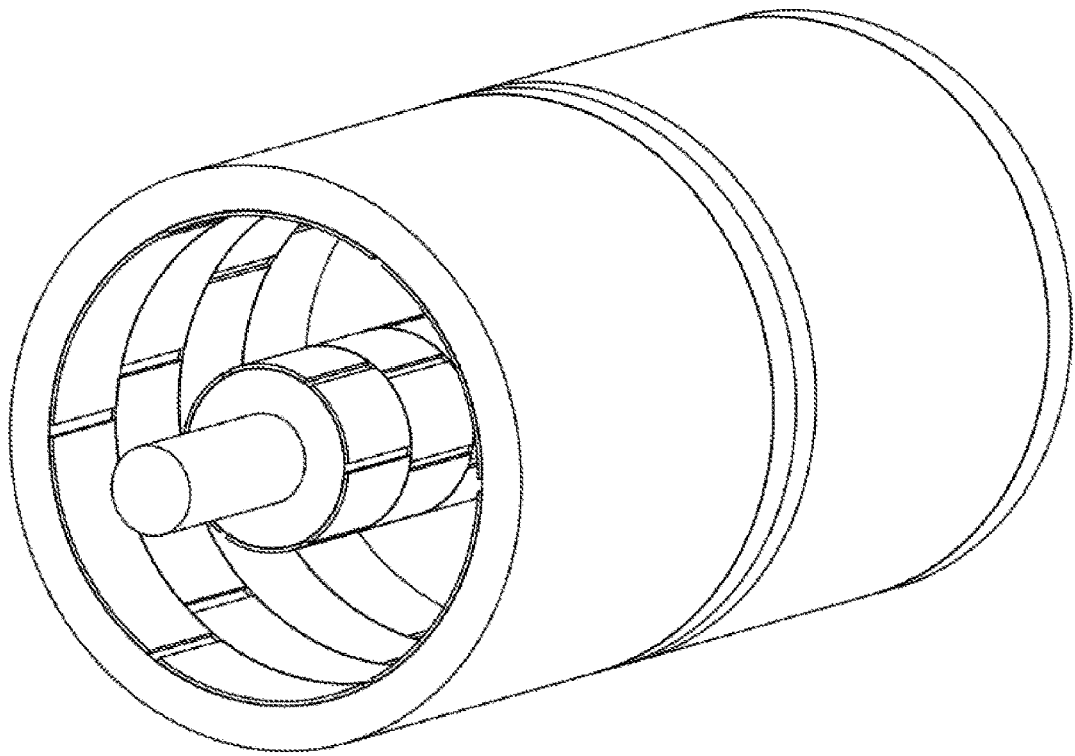
FIG. 12 is the structural diagram of the rotor of a new sinusoidal permanent magnet energy saving motor in an embodiment of the present invention
Figure 13:
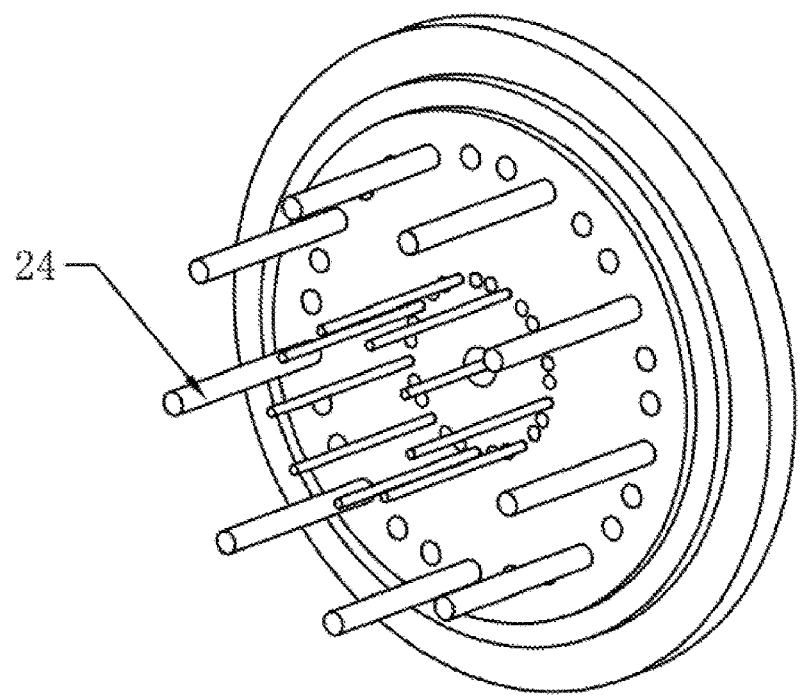
FIG. 13 is the structural diagram of the frontend cover or backend cover of a new four-stator and four-rotor combined energy-saving motor in an embodiment of the present invention
Figure 14:
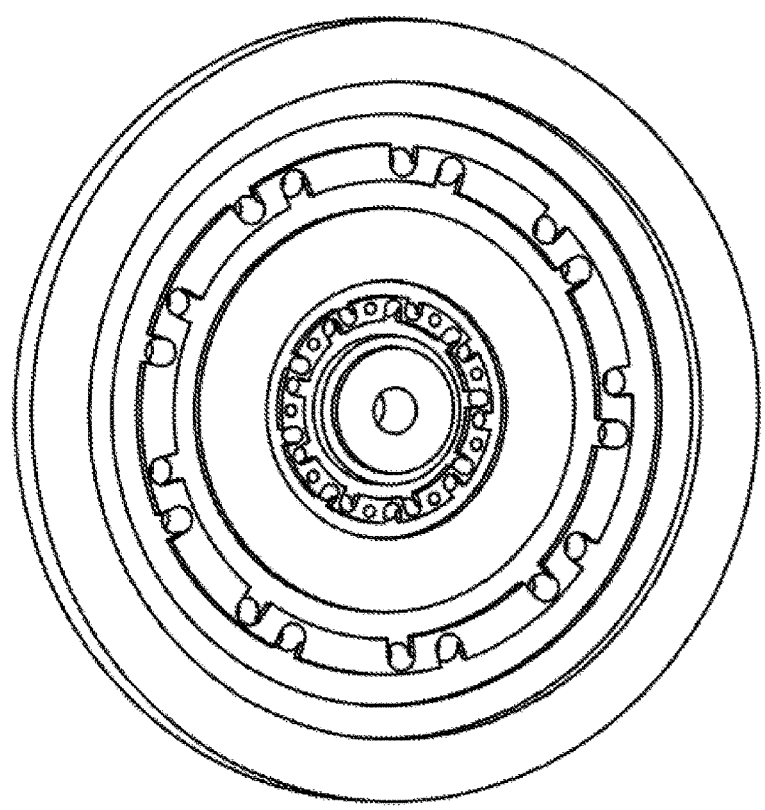
FIG. 14 is another structural diagram of the frontend cover or backend cover of a new four-stator and four-rotor combined energy-saving motor in an embodiment of the present invention
Figure 15:
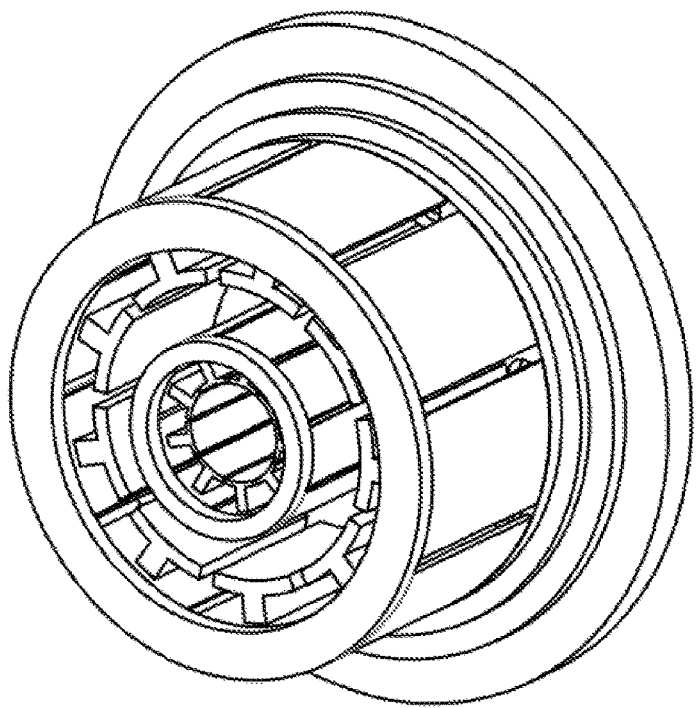
FIG. 15 is a matching diagram of the front or rear end cover and the stator of a new four-stator and four-rotor combined energy-saving motor in an embodiment of the present invention
Figure 16:
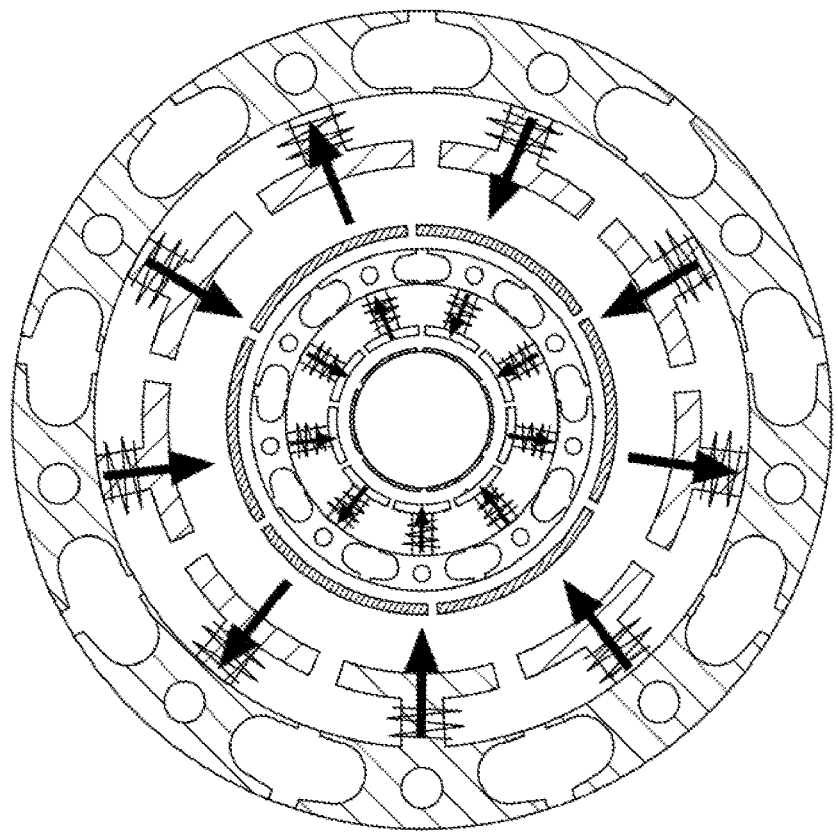
FIG. 16 shows the direction of the magnetic induction lines of the coils at the stator core at a certain moment of a new four-stator and four-rotor combined energy-saving motor of the present invention
Figure 17:
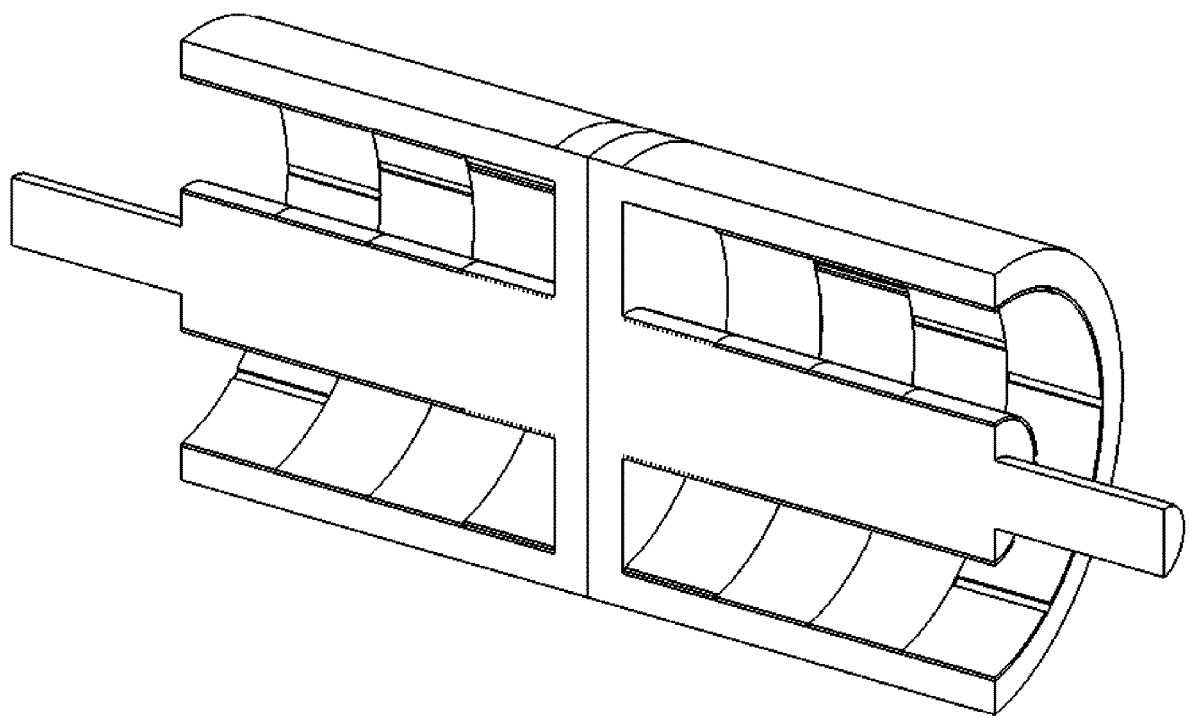
FIG. 17 is a sectional view of the rotor of a new four-stator four-rotor combined energy-saving motor in an embodiment of the present invention
Figure 18:
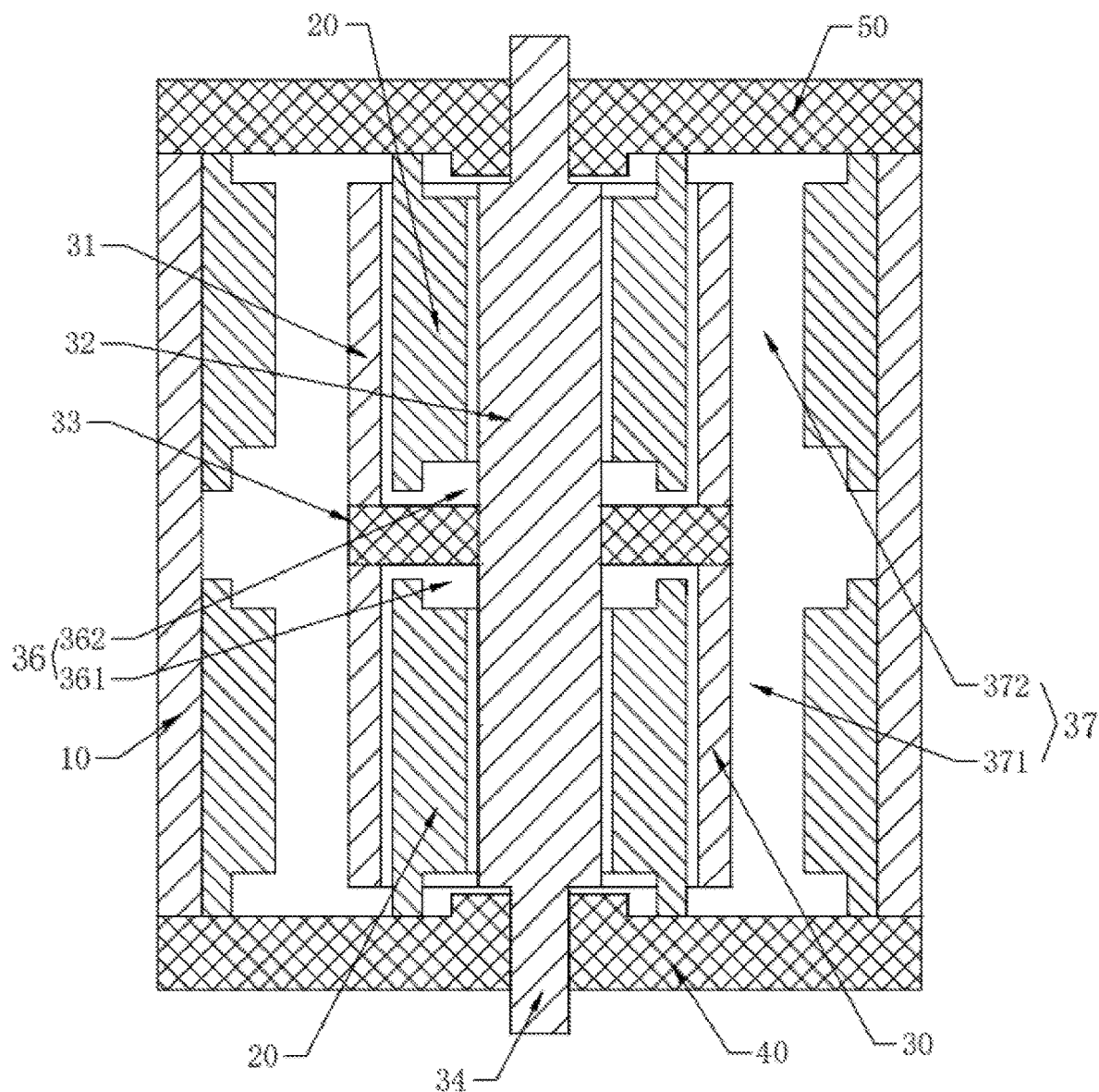
FIG. 18 is a sectional view of the structure of a new four-stator and four-rotor combined energy-saving motor in an embodiment of the present invention In the drawing:
10—motor shell; 20—stator; 21—fixing ring; 22—stator cores; 221—the first arch part; 222—the second arch part; 223—middle part; 224—fixing hole; 23—coils; 24—fixing support; 30—rotor; 31—outer rotor part; 32—inner rotor part; 33—flange; 34—rotating shaft; 35—permeant magnet module; 36—inner stator zone; 361—the first inner stator zone; 362—the second inner stator zone; 37—outer stator zone; 371—the first outer stator zone; the second outer stator zone; 40—frontend cover; 50—backend cover.

Explanations to accompanying drawings:

FIG. 1 shows the structural relationship of stator 20 and rotor 30 from a sectional view, the four stators 20 arranged in the stator zones respectively. FIG. 2 shows the overall picture of the motor. FIG. 3 shows the matching relationship of stator 20 and rotor 30 from a three-dimensional view. FIG. 4 shows the structural relationship of each component of the stator 20 in the inner stator zone 36. FIG. 5 shows the distributional relationship of the stator cores 22 of stator 20. FIG. 6 shows the structural relationship of each component of rotor 30, the structure of the rotor of a mixed-wave motor, the permanent magnet modules 35 of the outer rotor part 31 are inclinedly mounted along the side thereof, and the permanent magnet modules 35 of the inner rotor part 32 are vertically mounted along the side thereof. FIG. 7 shows the structure of the stator of the outer stator zone. FIG. 8 shows the structural relationship of stator 20 and rotor 30 from another sectional view. FIG. 9 shows the direction of the magnetic induction lines of the permanent magnet modules 35 of the inner rotor part 32 and outer rotor part 31 of rotor 30. FIG. 10-FIG. 12 show the structure of the rotor of the present invention in different embodiments, wherein FIG. 10 shows the structure of the rotor of a mixed-wave motor, FIG. 11 shows the structure of the rotor of a square-wave motor, and FIG. 12 shows the structure of the rotor of a sinusoidal-wave motor. FIG. 13 shows the structure of the fixing support 24 for fixing the stators 20 on the frontend cover or the backend cover. FIG. 14 shows the structure of the frontend cover or the backend cover in FIG. 13 from another direction. FIG. 15 shows the structure when the stators are fixed on the frontend cover or the backend cover in FIG. 13. FIG. 16 shows the direction of the magnetic induction lines of the coils 23 of stator 20 at a certain moment, each coil 23 generates magnetic induction lines towards both radial sides of stator core 22 as a separate magnet. FIG. 17 shows the sectional structure of rotor 30. FIG. 18 shows the sectional structure that the stators in the outer stator zone are fixed on the inner surface of the motor shell 10.

The technical scheme of the present invention is further explained in combination with the accompanying drawings and through the specific implementation method.

Embodiment 1: (an Implementation Mode of Utilizing the Magnetic Zone at Both Sides The new four-stator and four-rotor combined energy-saving motor in the embodiment comprises a motor shell 10, four rotors 30 and four stators 20, wherein the stators 20 and the rotors 30 are arranged in the motor shell, the stator 20 comprises a plurality of circularly distributed stator cores 22, and the stator cores 22 are wound with magnetic induction lines passing through the coils 23 at both radial sides of the stator cores 22. The rotor 30 comprises an outer rotor part 31, an inner rotor part 32 and a flange 32; an inner stator zone 36 is formed between the outer rotor part 31 and the inner rotor part 32, and an outer stator zone 37 is formed between the outer rotor part 31 and the motor shell 10; the outer rotor part 31 and the outer rotor part 32 are connected by flange 33, and the inner stator zone 36 is divided into a first inner stator zone 361 and a second inner stator zone 362 by flange 33; the outer stator zone 37 is divided into a first outer stator zone 371 and a second outer stator zone 372 by flange 33; the four stators 20 are arranged in the first and the second inner stator zones and the first and the second outer stator zones respectively; the inner side of the outer rotor part 31 and the outer side of the inner rotor part 32 are provided with a plurality of circularly distributed permanent magnet modules 35, and two adjacent permanent magnet modules 35 have opposite polarity.

There are various winding modes on the stator core, and the matching mode of coil 23 and permanent magnet module 35 is the same as that of ordinary motor. In an implementation mode, the quantity ratio of the permanent magnet modules 35 of the outer rotor part 31, coils 23 and the permanent magnet modules 35 of the inner rotor part is 2:3:2. The quantity ratio may change in other implementation modes.

Further, the outer rotor part 31 is made of a non-magnetic material so that the magnetic induction lines can pass through the outer rotor part 31.

The four-stator and four-rotor combined energy-saving motor in this embodiment can be used as both motor and generator.

When used as a motor, the coil 23 on the stator core 22 is supplied with three-phase current, and the working process of the two stators in the inner stator zone 36 is described: Since the stator core 22 is made of magnetic material, after the coil 23 on the stator core 22 is energized, the magnetic induction line of coil 23 can pass through both radial sides of the stator core 22; meanwhile, since the outer rotor part 31 and the inner rotor part 32 are located on both radial sides of the stator core 22 respectively, the magnetic induction lines generated by coil 23 act on the outer rotor part 31 and the inner rotor part 32 on both radial sides. At this point, each stator core 22 forms a separate magnet, which generates a magnetic zone with different phases. The N-pole and S-pole are on both radial sides of the stator core 22, facing the outer rotor part 31 and the inner rotor part 32 respectively. Among them, the directional strength of magnetic zone generated by coil 23 on stator core 22 changes with time, and the phases of coil 23 on adjacent stator cores 22 are different.

The working process of two stators in the outer stator zone 37 is described: After the three-phase current is applied, the coil 23 on the stator core 22 generates a magnetic zone, which acts on the permanent magnet module 35 of the outer rotor part 31.

When the three-phase current changes, the stators 20 of the outer stator zone and the inner stator zone generate a rotating magnetic zone respectively, which jointly drive the outer rotor part 31 and the inner rotor part 32 provided with permanent magnet modules 35 to rotate; when the magnetic zone of the stator core 22 changes, the stators 20 of the outer stator zone and the inner stator zone generate a rotating magnetic zone, the magnetic zone of the stator 20 of the inner stator zone 36 acts on the permanent magnet modules 35 of the outer rotor part 31 and the inner rotor part 32, and the magnetic zone of the stator of the outer stator zone 37 acts on the permanent magnet module 35 of the outer rotor part 31. Among them, the rotating magnetic zones of the stators of the outer stator zone and the inner stator zone change synchronously, and the forces exerted on the rotors 30 by the stators 20 of the outer stator zone and the inner stator zone have the same direction and can be superimposed, which makes the overall output power of rotors 30 equal to the sum of the powers of the outer rotor part 31 and the inner rotor part 32. When the magnetic zone of the stator cores 22 changes, the two stators 20 generate a rotating magnetic zone.

In a further implementation mode, in order to ensure the forces exerted on rotors 30 by the two stators of the outer stator zone and the two stators of the inner stator zone be superimposed, the number of wire slots of the coils 23 of the stator cores 22 of the outer stator zone and the inner stator zone are the same, the arch angles are the same and symmetrical, the phases and the magnetic induction line directions of the windings of the coils 23 at the opposite positions are the same, which makes the rotating magnetic zones of the stators 20 of the outer stator zone and the inner stator zone change synchronously. At this point, the magnetic zones of the stators 20 of the outer stator zone and the inner stator zone change synchronously, the phases thereof are the same, and the forces thereof exerted on rotors 30 have the same direction, which realizes higher superimposing effect.

In a further implementation mode, in order to ensure the forces exerted on the outer rotor part 31 and the inner rotor part 32 by the stators of the first and the second inner stator zones and the stators of the first and the second outer stator zones be superimposed, preferably, the two stators 20 of the first inner stator zone and the second inner stator zone correspond mutually, and the two stators 20 of the first outer stator zone and the second outer stator zone correspond mutually. The corresponding relationship means: the rotating magnetic zones have the same phase, the coils 23 have the same windings, and the rotations thereof are synchronous; specifically, the two stators 20 are horizontally symmetrically, the currents of the coils 23 of the corresponding stator cores 22 have the same phase, and the phases of the rotating magnetic zones generated after energizing have the same phase and the same direction. Further, the outer rotor part 31 the inner rotor part 32 are divided into two parts by flange 33 and are also horizontally symmetrical, and the permanent magnet modules 35 are arranged at constant positions and have the same polarity.

At this point, the two corresponding stators 20 have the same number of poles, and the forces exerted on the outer rotor part 31 and the inner rotor part 32 have the same direction, which makes the forces superimposed to drive the rotor 30 to rotate and further increases the output power of rotor 30.

In one embodiment, FIG. 9 shows the direction of the magnetic induction lines of the permanent magnet module 35.

In particular, when used as a motor, for stator 20 in inner stator zone 36, there are two actions that increase the output power of rotor 20.

First, since the magnetic induction line can pass through both radial sides of the stator core 22, the magnetic induction line of coil 23 is fully utilized. The rotating magnetic zone drives the inner rotor part 32 and outer rotor part 31 to rotate at the same time, and the output power of rotor 20 is equal to the sum of the output power of inner rotor part 32 and outer rotor part 31.

Second, within a certain angle range, the magnetic induction lines of the inner rotor part 32 can enhance the magnetic zone generated on the stator core 22, which increases the force exerted by the magnetic zone on the outer rotor part 31. Specifically, when rotor 30 rotates within a certain angle range, the stator core 22 with good magnetic permeability is affected by the magnetic induction line of inner rotor part 32 to generate an induced magnetic zone. Within this specific angle range, the induced magnetic zone generated by stator core 22 is in the same direction as the magnetic zone generated by coil 23; at this point, when the two magnetic zones are superimposed, the magnetic zone intensity generated on stator core 22 is equal to the sum of the rotating magnetic zone of coil 23 and the induced magnetic zone of stator core 22. As a result, the magnetic zone generated on the stator core 22 is strengthened and the magnetic zone acting on the outer rotor part 31 is strengthened, thus increasing the acting force on the outer rotor part 31. Similarly, in another specific angle range, the magnetic induction lines of the outer rotor section 31 can also enhance the magnetic zone generated on the stator core 22, thus increasing the force of the magnetic zone on the inner rotor section 32. In one embodiment, the cycle of a three-phase current is adaptively adjusted to obtain that particular angle.

The specific angle is generated under the following conditions: the induced magnetic zone generated by the stator core 22 under the permanent magnet module 35 has the same direction as the rotating magnetic zone of the coil 23.

Taking the rotating magnetic zone of coil 23 on a stator core 22 enhanced by inner rotor part 32 as an example, the occurrence of one of the specific angles is described: the directional strength of magnetic zone on a certain coil 23 varies with time. During a certain period of time, coil 23 on a certain stator core 22 generates a magnetic zone in one direction; meanwhile, one of the permanent magnet modules 35 of the inner rotor part 32 generates a magnetic induction line in the direction opposite to that of the coil 23 towards the inner stator zone 36. When the permanent magnet module 35 rotates from one side of the stator core 22 to the position of the opposite stator core 22, the magnetic flux on the stator core 22 increases, thus the stator core 22 generates an inductive magnetic zone opposite to the magnetic zone of the permanent magnet module 35. At this point, the direction of the induced magnetic zone generated is the same as that of the magnetic induction line of coil 23, thus enhancing the rotating magnetic zone of coil 23. In the actual situation, the magnetic zone of coil 23 can be effectively enhanced with more locations meeting the occurrence conditions of this particular angle.

The above two actions coordinate with each other and increase the output power of rotor 30.

It should be noted in particular that the four rotors in this embodiment refer to the two outer rotor parts 31 and the two inner rotor parts 32 formed by the division of flange 33.

The second action as stated above can also increase the force exerted on the outer rotor part 31 of stator 20 in the outer stator zone 37. Specifically, as stated above, due to the existence of the second action, the stator core 22 in the inner stator area with the enhanced magnetic zone enhances the magnetic zone of the outer rotor part 31 within a specific angular range. At this point, the acting force of stator 20 of the outer stator zone 37 on the outer rotor part 31 is increased.

In fact, the outer rotor part 31 and the inner rotor part 32 are divided into two parts by flange 33, one portion of the two-part rotor 30 corresponds to the two stators of the first inner stator zone 361 and the first outer stator zone 371, and the other portion of the rotor 30 corresponds to the two stators of the second inner stator zone 362 and the second outer stator zone 372. For stator 20 arranged in the second inner stator zone 362 and the second outer stator zone 372 respectively, the above effects exist. In this embodiment, the four stator 20 drives the rotation of the four parts, and the overall output power of the rotor 30 is equal to the sum of the powers of the four rotating parts.

In a further embodiment, the forces applied by the four stators to the outer rotor part 31 and the inner rotor part 32 can be superimposed, preferably, the rotating magnetic zones of the four stators 20 have the same phase, the coils 23 have the same number of windings, and the rotations thereof are synchronous; specifically, the four stators 20 are horizontally symmetrical, the currents of the coils 23 of the corresponding stator cores 22 have the same phase, the rotating magnetic zones after energizing have the same phase and the same direction. Further, the outer rotor part 31 and the inner rotor part 32 are divided into two parts by flange 33 and are also horizontally symmetrical, and the permanent magnet modules 35 are arranged at constant positions and have the same polarity.

At this point, the four stators 20 have the same number of poles, and the forces on the outer rotor part 31 and the inner rotor part 32 are the same, which are superimposed to drive the rotor 30 to rotate and further improve the output power of the rotor 30.

Compared with traditional motors, this embodiment adopts the structural design of stator 20 and rotor 30, and each stator core 22 is used as a separate electromagnetic winding for the stator 20 within the inner stator zone 36, thus the magnetic zones on both sides of several separate electromagnetic windings are used to drive the outer rotor part 31 and the inner rotor part 32 of rotor 30; the magnetic zones on both sides of the stator 20 of the inner stator zone 36 are used to drive the inner rotor part 32 and the outer rotor part 31, and the total output power of rotor 30 is equal to the sum of the output power of inner rotor part 32 and outer rotor part 31, which fully utilizes the magnetic zone on both sides of the stator 20 and the internal space of the motor and avoids energy waste. The magnetic zone of stator 20 in the outer stator zone 37 drives the outer rotor part 31 to rotate, which further improves the output power of rotor 30. Compared with the traditional motor, under the same power, the present invention uses fewer winding sets, which reduces stator 20 size, uses fewer winding materials, and has higher economic benefit. Meanwhile, the magnetic zones on both sides of the permanent magnet module 35 on the outer rotor part 31 are also utilized, the two stator 20 are driven to rotate by the magnetic zone of the permanent magnet module 35 on the outer rotor part 31, which further improves the output power of the rotor 30. Compared with the traditional motor, when the same power is achieved, the magnetic zone on both sides of the outer rotor part 31 is utilized, which can further improve the energy utilization efficiency and achieve the purpose of energy conservation and environmental protection.

When used as a generator, since the stator cores 22 are made of magnetic material, the magnetic induction lines of the permanent magnet modules 35 of the inner rotor part 32 and the outer rotor part 31 can pass through both radial sides of the stator cores 22 of the stator 20 of the inner stator zone 36 and act on the coils 23; meanwhile, the magnetic induction lines of permanent magnet module 35 of outer rotor part 31 can also act on coil 23 of stator 20 of outer stator zone 37. At this point, when the rotor 30 rotates, the permanent magnet modules 35 thereof rotate and generate a rotating magnetic zone, the coils 23 of the stators 20 of the outer rotor zone and the inner rotor zone generate electromagnetic induction and generate synchronous electromotive force and output power.

For stators 20 arranged in the second inner stator zone 362 and the second outer stator zone 372 respectively, the above effects exist, the output power of the generator is equal to the sum of the generated powers of the four stators that drive the four rotating parts.

In one embodiment, the outer rotor part 31 and the inner rotor part 32, which are divided into two parts by flange 33, are also horizontally symmetrical, and the permanent magnet modules 35 are distributed in a consistent position; thus, the initial phase and frequency of the alternating current generated by the rotor 30 rotation on the four stator 20 are the same, thus the electromotive force generated on stator 20 is superposed.

Compared with the traditional generator, the coil 23 on the stator 20 of the inner stator zone 36 in this embodiment is simultaneously affected by the magnetic induction line from the permanent magnet module 35 on the outer rotor part 31 and the permanent magnet module 35 on the inner rotor part 32, and in the inner stator zone 36, the flux of coil 23 on stator 20 changes more, which can generate more electromotive force.

Embodiment 2

This embodiment provides a method for fixing the stators 20 of a new four-stator and four-rotor combined energy-saving motor. In an embodiment, as shown in FIG. 18, the stator cores 22 of the stator of the outer stator zone 37 are fixed on the inner surface of the motor shell 10; at this point, the arrangement mode of the stator in the outer stator zone 37 is the same as that of the traditional motor. Furthermore, when the stator in the outer stator zone 37 is set on the inner surface of the motor shell 10, the stators in the outer stator zone 37 can be set to more than two, which jointly drive the outer rotor part 31 to rotate and further realizes higher output power.

In another embodiment, as shown in FIG. 5, the stators of outer stator zone 37 and inner stator zone 36 are fixed on the end covers, wherein the stators of the first inner stator zone 361 and the first outer stator zone 371 are fixed on the frontend cover 40, and the stators of the second inner stator zone 362 and the second outer stator zone 372 are fixed on the backend cover 50. Specifically, the stator 20 further comprises a fixing ring 21 and a fixing support 24, wherein the stator cores 22 are circularly distributed on the fixing ring 21, and the support 24 fixes the stator cores 22 on the fixing ring 21. Preferably, two fixing rings 21 are set, and the stator cores 22 are fixed between the two fixing rings 21.

In an embodiment, the stator cores 22 are an I-shaped structure, which comprises a first arch part 221, a second arch part 222 and a middle part 223, wherein the first arch part and the second arch part are connected by the middle part 223, and the coils are wound on the middle part 223 with slots at both sides. The stator cores 22 of the stator 20 of the inner stator zone 36 are configured as follows: the first arch part 221 faces towards the outer rotor part 31, and the second arch part 222 faces towards the inner rotor part 32.

In an embodiment, when the stators of the outer stator zone 37 and the stators of the inner stator zone 36 are fixed on the frontend cover 40, the stator cores 22 of the stators 20 of the outer stator zone 37 are configured as follows: the second arch part 222 faces towards the outer rotor part 31.

In a further embodiment, a fixing hole 224 of the first arch part 221 vertically runs through the first arch part 221, and the fixing support 24 passes through the fixing hole 224 and is fixedly connected to the fixing ring 21, to keep a relative position between stator cores 22.

Preferably, two fixing rings 21 are set, and the stator cores 22 are fixed between the two fixing rings 21; one end of the fixing support 24 penetrates into the fixing hole 224 from one side of fixing ring 21, extends towards the other fixing ring 21 along the fixing hole 224, and is fixed connected to the other fixing ring 21. Further, the other end of the fixing support 24 is fixed on the frontend cover 40 or the backend cover 50, and the frontend cover 40 and the backend cover 50 correspond to each other and are arranged at both sides of the motor shell 10 respectively.

Embodiment 3

This embodiment provides a new four-stator and four-rotor mixed-wave combined energy-saving motor, which is capable of generating mixed waves, as shown in FIG. 6. FIG. 6 shows the structure of the rotor of a mixed-wave motor, wherein each of the permanent magnet modules 35 comprises a plurality of permanent magnets, the permanent magnets of the permanent magnet modules 35 of the inner rotor part 32 are vertically mounted along the outer side thereof, and the permanent magnets of the permanent magnet modules 35 of the outer rotor part 31 are inclinedly mounted along the inner side thereof. Or, FIG. 10 shows the structure of the rotor of a mixed-wave motor, wherein the permanent magnets of the permanent magnet modules 35 of the inner rotor part 32 are inclinedly mounted along the outer side, and the permanent magnets of the permanent magnet modules 35 of the outer rotor part 31 are vertically mounted along the inner side thereof.

When used as a motor, the working process of the present embodiment is similar to that of the above embodiment 1.

When used as a generator, in particular, in this embodiment, the inclined permanent magnet module 35 enables stator 20 to generate sinusoidal alternating current; meanwhile, the vertically mounted permanent magnet module 35 enables stator 20 to generate square wave alternating current. Thus, the sinusoidal wave combined with square wave can be generated on stator 20 to realize the mixed wave output; according to the need, the waveform of alternating current can be selected adaptively to make it suitable for practical application.

In this embodiment, since the output waveform is a mixed wave of sinusoidal wave combined with square wave, the sinusoidal wave controller or square wave controller can be selected when selecting the controller, which improves the applicability of the motor of this embodiment.

Further, the angle of inclination of the inclinedly mounted permanent magnets is 5 to 15 degrees, preferably to be 16 degrees. As shown in FIG. 6 and FIG. 10, the angle of inclination of the inclinedly mounted permanent magnets is 10 degrees.

In an embodiment, when the permanent magnets 35 of the outer rotor part 31 or the inner rotor part 32 are inclinedly mounted, the inclined mounted permanent magnets 35 are divided to correspond to different stators 20 by flange 33; at this point, the permanent magnets 35, which correspond to different stators 20, have the mutually corresponding positions, which superimposes and maximizes the force of the stators with two same rotating magnetic fields on the rotor part with permanent magnets.

Embodiment 4

This embodiment provides a new sinusoidal-wave or square-wave combined energy-saving motor with four stators and four rotors, which are capable of generating sinusoidal wave or square wave. As shown in FIG. 11 and FIG. 12, the permanent magnet modules 35 of the inner rotor part 32 and the outer rotor part 31 have opposite positions and the same quantity, and the permanent magnet modules 35 at the opposite positions of the inner rotor part 32 and the outer rotor part 31 have opposite polarity facing the inner stator zone 36.

When used as an electric motor, in this embodiment, the output power of rotor 30 can be further increased for the following reasons:

As the permanent magnet modules 35 at the opposite positions of the outer rotor part 31 and the inner rotor part 32 have opposite polarity, the magnetic induction lines of the permanent magnet modules 35 of the outer rotor part 31 and the inner rotor part 32 are mutually constrained, thus most of the magnetic induction lines of permanent magnet modules 35 are constrained between the opposite permanent magnet modules 35; the magnetic induction lines in the inner stator zone 36 are more concentrated and the magnetic field is stronger. Thus, when the coils 23 are energized and generate a rotating magnetic field, the force exerted on the permanent magnet modules 35 at inner and outer sides by the rotating magnetic field is strengthened, which further the output power of rotor.

Particularly, an internal rotor motor is formed by the stators in the outer rotor part 31 and the outer stator zone 37. Compared with the existing internal rotor motor, the internal rotor motor in this embodiment realizes higher output power as it is formed by the stators in the outer rotor part 31 and the outer stator zone 37. The reasons are as follows:

Due to the existence of stator 20 in inner stator zone 36 and the opposite polarity of permanent magnet modules 35 on outer rotor part 31 and inner rotor part 32, the magnetic induction lines of permanent magnet modules 35 on outer rotor part 31 and inner rotor part 32 are attracted by the iron stator 20; thus, the magnetic induction lines from the permanent magnet module 35 on the inner rotor part 32 can be extended to the outer rotor part 31 after passing the stator of the inner stator region 36; furthermore, the magnetic field of the outer rotor part 31 towards the outer stator zone 37 is enhanced, thus, the stator 20 of outer stator zone 37 can generate stronger driving force to outer rotor part 31, which further enhances the overall output power of the motor.

When used as a generator, it is similar to that used as a motor. There is also the situation that the magnetic sensing lines are constrained mutually, which leads to the accumulation of magnetic sensing lines. The generating power of the generator is enhanced. Similarly, compared with ordinary internal rotor motors, this internal rotor motor, which is formed by the stators in the outer rotor part 31 and the outer stator zone 37, can generate higher alternating current due to the strengthening effect of the stators 20 in the inner stator zone 36; since the alternating current generated by the outer rotor part 31 on stators of the inner stator zone 36 is superimposed with the alternating current generated by the inner rotor part 32 on the stators of the inner stator zone 36, which increases the output power.

In a further embodiment, FIG. 12 shows the structure of the rotor of a sinusoidal-wave motor, wherein the permanent magnets of the permanent magnet modules 35 of the inner rotor part 32 and the permanent magnet modules 35 of the outer rotor part 33 are inclinedly mounted along the corresponding sides thereof, preferably the angles of inclination of the permanent magnets of the two parts are the same.

When used as an electric motor, the working process of this embodiment is similar to the above.

In an embodiment, the angle of inclination of the inclinedly mounted permanent magnets of the permanent magnet modules 35 is 5 to 15 degrees, preferably to be 10 degrees. As shown in FIG. 10, the angle of inclination of the permanent magnets is 10 degrees.

When used as an electric motor, the working process of this embodiment is similar to the above. When used as a generator, the superimposed sinusoidal alternating current is generated, and the angle of inclination of the inclinedly mounted permanent magnets of the permanent magnet modules 35 affects the waveform of the sinusoidal wave generated by stator 20.

According to the actual applications, choose the angle of inclination reasonably.

In a further embodiment, FIG. 11 shows the structure of the rotor of a square-wave motor, wherein the permanent magnets of the permanent magnet modules 35 of the inner rotor part are vertically mounted along the outer side the inner rotor part, and the permanent magnets of the permanent magnet modules 35 of the outer rotor part are vertically mounted along the inner side of the outer rotor part.

When used as an electric motor, this embodiment is similar to the above process. When used as a generator, this embodiment generates square-wave alternating current.

This embodiment can be used as a damping motor when the permanent magnet module 35 is mounted vertically. When used as a damping motor, the inner side of the outer rotor part 31 is opposite to the outer side of the permanent magnet module 35 of the inner rotor part 32, and the magnetic field direction is the same. At this point, the magnetic fields of the permanent magnet module 35 of the inner rotor part 32 and the permanent magnet module 35 of the outer rotor part 31 can be superposed directly due to their relative positions, so that the magnetic fields acting on stator 20 are larger than that of any of the permanent magnets inclinedly mounted. When rotors 30 rotate, especially when the stators 20 in the inner stator zone 36 rotate between two permanent magnet modules 35, the flux of coil 23 on stator 20 changes from one side to the other, and the numerical change is so big that the stator 20 generates a high induced electromotive force, which hinders the further rotation of rotor 30.

In this embodiment, similarly, since the two parts of permanent magnet module 35 can be superposed, compared with the traditional damping motor, the induced electromotive force generated on stator 20 is larger and the damping effect is better.

Embodiment 5: (the Method for Mounting the Rotating Shaft and the Frontend Cover This embodiment provides a method for setting the rotating shaft of a new sinusoidal-wave or square-wave combined energy-saving motor with four stators and four rotors, which further comprises a rotating shaft 34, wherein the rotating shaft 34 is connected to the inner rotor part, and passes through and is connected to the frontend cover 40 and the backend cover 50 through rotation of a bearing, and the stators 20 are fixed on the frontend cover 40 and the backend cover 50.

When combined with embodiment 2, the one end of the fixing support 24 passes through the fixing ring 21 and is fixed on the frontend cover 40 or the backend cover, and the other end penetrates through the fixing hole 224 of the stator cores 22 and extends to and is fixed to the fixing ring 21 where the stator cores 22 are circularly distributed.

When both vertical sides of the stator cores 22 are provided with a fixing ring 21, a hole for the fixing support 24 to pass through is arranged on the fixing rings 21 facing the frontend cover 40 or the backend cover 50, and the fixing support 24 passes through the hole, enters the fixing hole 224 of the stator cores 22 and extends towards and is fixed to the fixing ring 21 of the stator core 22 far away the end cover.

In this embodiment, a water-cooled heat dissipation structure can be set to dissipate heat from stator 20, whose specific structure is similar to that disclosed by CN204012958U.

The present invention is described by preferred embodiments and is known to the technical personnel in the field that, without deviating from the spirit and scope of the present invention, various changes or equivalent substitutions may be made to these characteristics and embodiments. The present invention shall not be restricted by the specific embodiments disclosed herein, and other embodiments falling within the claims of this application shall fall within the scope of protection of the present invention.

The invention claimed is:

1. A new four-stator energy-saving motor comprises a motor shell, two rotors and four stators, wherein the stators and the rotors are arranged in the motor shell,
    each of the stators comprises a plurality of circularly distributed stator cores, and the stator cores are wound with magnetic induction lines passing through the coils at both radial sides of the stator cores;
    each of the rotors comprises an outer rotor part, an inner rotor part and a flange;
    the outer rotor part, arranged outside the cylindrical inner rotor part; the flange, connecting the outer rotor part and the inner rotor part;
    an inner stator zone is formed between the outer rotor parts and the inner rotor parts, and an outer stator zone is formed between the outer rotor parts and the motor shell;
    each outer rotor part and each inner rotor part are connected by the flange, and the inner stator zone is divided into a first inner stator zone and a second inner stator zone by the flange; the outer stator zone is divided into a first outer stator zone and a second outer stator zone by the flange; the four stators are arranged in the first inner stator zone, the second inner rotor zone, the first outer stator zone and the second outer stator zone respectively;
    the inner side of each outer rotor part and the outer side of each inner rotor part are provided with a plurality of circularly distributed permanent magnet modules, and two adjacent permanent magnet modules have opposite polarity,
    wherein each permanent magnet module comprises a plurality of permanent magnets,
    wherein the permanent magnets of each permanent magnet module of each outer rotor part are mounted on the inner side of the outer rotor part along a circumferential direction of the outer rotor part,
    wherein each of the permanent magnets is offset by a substantial distance at the circumferential direction from another axially adjacent one of the permanent magnets, and
    wherein the permanent magnets of the permanent magnet module of each inner rotor part are vertically mounted along the outer side thereof, and the permanent magnets of the permanent magnet module of each outer rotor part are inclinedly mounted along the inner side thereof;
    or the permanent magnets of the permanent magnet module of each inner rotor part are inclinedly mounted along the outer side of the inner rotor part, and the permanent magnets of the permanent magnet module of each outer rotor part are vertically mounted along the inner side of the outer rotor part.

2. The new four-stator energy-saving motor according to claim 1 is characterized in that the stator cores of each stator in the outer stator zone are fixed on the inner surface of the motor shell.

3. The new four-stator energy-saving motor according to claim 1 is characterized in that each stator further comprises a fixing ring, and the stator cores are circularly distributed on the fixing ring,
    each stator further comprises a fixing support, and the fixing support fixes the stator cores on the fixing ring; the stator cores are an I-shaped structure, which comprises a first arch part, a second arch part and a middle part, wherein the first arch part and the second arch part are connected by the middle part, and the coils are wound on the middle part with slots at both sides; a fixing hole of the first arch part vertically runs through the first arch part, and the fixing support passes through the fixing hole and is fixedly connected to the fixing ring;
    the stator cores of each stator in the inner stator zone are arranged as follows: the first arch part faces towards the outer rotor part, and the second arch part faces towards the inner rotor part.

4. The new four-stator energy-saving motor according to claim 1 is characterized in that the angle of inclination of the inclinedly mounted permanent magnets is 5 to 15 degrees.

5. The new four-stator energy-saving motor according to claim 1 is characterized in that it further comprises a rotating shaft, wherein the rotating shaft is connected to each inner rotor part, and passes through and is connected to the frontend cover and the backend cover through rotation of a bearing, and two of the four stators are fixed on the frontend cover and the two other stators are fixed on the backend cover.

* * * * *